United States Patent
Li et al.

(10) Patent No.: US 12,301,030 B2
(45) Date of Patent: May 13, 2025

(54) ENERGY STORAGE SYSTEM

(71) Applicant: Huawei Digital Power Technologies Co., Ltd., Shenzhen (CN)

(72) Inventors: Jianshan Li, Shanghai (CN); Yanzhong Zhang, Shanghai (CN); He Zhou, Shanghai (CN); Zhipeng Wu, Shenzhen (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 649 days.

(21) Appl. No.: 17/708,506

(22) Filed: Mar. 30, 2022

(65) Prior Publication Data

US 2022/0320873 A1    Oct. 6, 2022

(30) Foreign Application Priority Data

Mar. 31, 2021 (CN) .................... 202110346044.X

(51) Int. Cl.
*H02J 7/00* (2006.01)

(52) U.S. Cl.
CPC .......... *H02J 7/0019* (2013.01); *H02J 7/0031* (2013.01); *H02J 2207/20* (2020.01)

(58) Field of Classification Search
CPC .. H02J 7/007194; H02J 7/0019; H02J 7/0024; H02J 7/0048
USPC ....................................................... 320/119
See application file for complete search history.

(56) References Cited

U.S. PATENT DOCUMENTS

| | | | |
|---|---|---|---|
| 2012/0062038 A1 | 3/2012 | Wang | |
| 2014/0312828 A1 | 10/2014 | Vo et al. | |
| 2017/0005371 A1* | 1/2017 | Chidester | H01M 50/20 |
| 2019/0334349 A1* | 10/2019 | Liu | G05B 19/045 |
| 2020/0055405 A1* | 2/2020 | Duan | H02J 7/0014 |
| 2020/0185934 A1 | 6/2020 | Zavodny et al. | |
| 2021/0075218 A1* | 3/2021 | Cao | H02H 3/087 |

FOREIGN PATENT DOCUMENTS

| | | |
|---|---|---|
| CN | 103368268 B | 4/2015 |
| CN | 107086629 A | 8/2017 |
| CN | 207053206 U | 2/2018 |
| CN | 109039136 A | 12/2018 |
| CN | 110460125 A | 11/2019 |
| CN | 110912235 A | 3/2020 |

* cited by examiner

*Primary Examiner* — Julian D Huffman
*Assistant Examiner* — Aiman Bickiya
(74) *Attorney, Agent, or Firm* — WOMBLE BOND DICKINSON (US) LLP

(57) ABSTRACT

An energy storage system, to improve operating efficiency and system reliability that exist when a component in the energy storage system is faulty, and avoid a waste of resources. The energy storage system includes a plurality of energy storage branches, at least one switch unit, and a control circuit. Each of the energy storage branches includes a first bus, a string-level converter, and a battery string that are sequentially connected in series, a plurality of balancing converters, and a shared bus. The battery string includes a plurality of battery units connected in series, and each of the battery units includes one battery pack. The battery pack is connected to an input side of one corresponding balancing converter, and output sides of the plurality of balancing converters are separately connected to the shared bus.

18 Claims, 7 Drawing Sheets

ENERGY STORAGE SYSTEM

CROSS-REFERENCE TO RELATED APPLICATION

This application claims priority to Chinese Patent Application No. 202110346044.X, filed on Mar. 31, 2021, which is hereby incorporated by reference in its entirety.

TECHNICAL FIELD

This application relates to the field of energy storage technologies, and in particular, to an energy storage system.

BACKGROUND

An energy storage system usually includes a plurality of battery strings. As shown in FIG. 1, the energy storage system may include a battery string A1 and a battery string A2. Each of the battery strings may include a plurality of battery packs connected in series. Each of the battery strings may be connected to one string-level direct current/direct current converter. A first terminal of the string-level direct current/direct current converter is connected to a first terminal of one battery string, a second terminal is connected to a low level, and a third terminal is connected to a direct current bus. A second terminal of each of the battery strings is connected to a low level. For example, a direct current bus C1, a string-level direct current/direct current converter B1, and a battery string A1 form a charging/discharging loop. The string-level direct current/direct current converter B1 may obtain power from the direct current bus C1, or may transmit electric energy to the direct current bus C1. In this way, the energy storage system stores or supplies energy. Generally, each battery pack in each of the battery strings is connected to one balancing converter, that is, one battery pack is connected to one balancing converter, to implement maximum-power current balancing of battery strings. A first terminal of each balancing converter is connected to a battery pack, and a second terminal of each balancing converter is connected to a shared bus. For example, a battery pack A11 is connected to a first terminal of a balancing converter D11, and a second terminal of the balancing converter D11 is connected to a shared bus F11.

If one battery pack in the battery string A1 is faulty or fails, for example, the battery pack A11 is faulty, the battery string A1 stops operating. Consequently, a non-faulty battery pack in the battery string A1 also stops working. If the string-level direct current/direct current converter B1 connected to the battery string A1 is faulty, the battery string A1 cannot continue to operate, either. In the two cases, the non-faulty battery string or battery pack cannot operate due to a fault of another component in the charging/discharging loop in which the non-faulty battery string or battery pack is located. This not only causes a waste of resources, but also reduces operating efficiency of the energy storage system.

SUMMARY

This application provides an energy storage system, to improve operating efficiency and system reliability that exist when a component in the energy storage system is faulty, and avoid a waste of resources.

According to a first aspect, an embodiment of this application provides an energy storage system, including a plurality of energy storage branches, at least one switch unit, and a control circuit. Each of the energy storage branches includes a first bus, a string-level converter, and a battery string that are sequentially connected in series, a plurality of balancing converters, and a shared bus. The battery string includes a plurality of battery units connected in series, and each of the battery units includes one battery pack. Each of the battery packs is connected to an input side of one corresponding balancing converter, and output sides of the plurality of balancing converters are separately connected to the shared bus. A positive terminal of the battery string is connected to the string-level converter, and a negative terminal of the battery string is connected to a reference ground. The string-level converter is configured to: modulate a voltage on the first bus to a charging voltage, to charge the battery string; or modulate a voltage of the battery string to a discharging voltage, to charge a load coupled to the first bus. Each of the balancing converters is configured to: when the balancing converter operates in a first working mode, balance a current of a connected battery pack; and when the balancing converter operates in a second working mode, modulate a voltage of the shared bus to a charging voltage, to charge the connected battery pack; or modulate the voltage of the connected battery pack to a discharging voltage, and output the discharging voltage to the connected shared bus. The switch unit is disposed between two neighboring energy storage branches; and shared buses in the two energy storage branches are conducted if the switch unit is in a first state, or the shared buses in the two energy storage branches are not conducted if the switch unit is in a second state. The control circuit is separately coupled to the at least one switch unit and each of the energy storage branches, and is configured to: when the control circuit determines that any component in a first energy storage branch in the two neighboring energy storage branches is faulty, control a switch unit between the first energy storage branch and a neighboring second energy storage branch to be in the first state, and control an operating mode of each of the balancing converters in the first energy storage circuit to switch from the first working mode to the second working mode, where the any component includes a battery pack and/or a string-level converter.

In this embodiment of this application, a battery string in an energy storage branch in which a string-level converter or a battery pack is faulty may be charged or discharged by using a neighboring energy storage branch. The control circuit controls the switch unit between the shared buses of the two neighboring energy storage branches to be in the first state, so that the battery string in the faulty energy storage branch is charged or discharged by using a non-faulty energy storage branch. This can improve availability of the battery string in the energy storage branch in which the string-level converter is faulty; and can also improve operating efficiency and system reliability that exist when a component in the energy storage system is faulty, and avoid a waste of non-faulty battery pack resources in the faulty energy storage branch.

In one embodiment, each switch unit includes a plurality of switches, and each of the shared buses includes a positive bus and a negative bus. A first switch in the plurality of switches is connected between positive buses in the two neighboring energy storage branches, and a second switch in the plurality of switches is connected between negative buses in the two neighboring energy storage branches. When the first switch and the second switch are both in an on state, the switch unit is in the first state; or when the first switch and the second switch are both in an off state, the switch unit is in the second state.

In one embodiment, the any component is a first battery pack in the first energy storage branch, and the first battery pack is any battery pack in a battery string in the first energy storage branch. The control circuit is further configured to: control the string-level converter in the first energy storage branch to stop working, so that the battery string and a first bus in the first energy storage branch are open-circuited; control the switch unit between the first energy storage branch and the second energy storage branch to be in the first state, so that the shared buses in the first energy storage branch and the second energy storage branch are conducted; control a balancing converter connected to the first battery pack to stop working, so that the first battery pack and a shared bus in the first energy storage branch are not conducted; and control balancing converters respectively connected to battery packs in the first energy storage branch other than the first battery pack, to switch from the first working mode to the second working mode.

In this embodiment of this application, because a balancing converter corresponding to a faulty battery pack stops working, the faulty battery pack and a shared bus in an energy storage branch to which the faulty battery pack belongs are not conducted. The control circuit controls the switch unit between the shared buses of the two neighboring energy storage branches to be in the first state, to charge or discharge a non-faulty battery pack in the faulty energy storage branch by using a non-faulty energy storage branch. This can improve availability of a battery pack in the branch; and can also improve operating efficiency and system reliability that exist when a component in the energy storage system is faulty, and avoid a waste of non-faulty battery pack resources in the faulty energy storage branch.

In one embodiment, the battery unit further includes a third switch and a fourth switch. The third switch is connected in series to the battery pack in the battery unit to form a first branch; the fourth switch is connected in parallel to the first branch; and the battery pack in the battery unit is short-circuited if the fourth switch is in an on state, or the battery pack in the battery unit is not short-circuited if the fourth switch is in an off state. Two neighboring battery units are conducted if a third switch in a previous battery unit in the two battery units is in an on state, or the two battery units are not conducted if the third switch in the previous battery unit is in an off state. The control circuit is further configured to: control a third switch in a battery unit to which the first battery pack belongs to be in the off state and a fourth switch to be in the on state if a first battery pack in the first energy storage branch is faulty; control the string-level converter in the first energy storage branch to stop working, so that a battery string and a first bus in the first energy storage branch are open-circuited; control the switch unit between the first energy storage branch and the second energy storage branch to be in the first state, so that the shared buses in the first energy storage branch and the second energy storage branch are conducted; and control a balancing converter connected to a battery pack in the first energy storage branch other than the first battery pack to switch from the first working mode to the second working mode.

In this embodiment of this application, the control circuit controls the third switch in the battery unit to which the faulty first battery pack belongs to be in the off state and the fourth switch to be in the on state. In this way, the first battery pack can be isolated from the battery string to which the faulty first battery pack belongs, or no current can be transmitted between the first battery pack and the connected balancing converter, so that the first battery pack and the shared bus in the energy storage branch to which the first battery pack belongs are not conducted.

In one embodiment, each of the energy storage branches further includes a circuit protection component. A terminal of the circuit protection component is connected to the battery string, another terminal is connected to the string-level converter, and the circuit protection component is configured to perform overload protection on the energy storage branch. In this embodiment of this application, the circuit protection component disposed in each of the energy storage branches may perform overload protection on a circuit to which the energy storage branch belongs. This improves circuit operating safety.

In one embodiment, the string-level converter includes a direct current/direct current converter, or the string-level converter includes a direct current/alternating current converter. In this embodiment of this application, a string-level converter in each of the energy storage branches may be a direct current/direct current converter, so that the energy storage system can be applied to a direct current scenario. The string-level converter in each of the energy storage branches may be a direct current/alternating current converter, so that the energy storage system can be applied to an alternating current scenario.

According to a second aspect, this application provides an energy storage system. The system includes at least one energy storage branch, at least one switch unit, at least one backup converter, and a control circuit. Each energy storage branch includes a first bus, a string-level converter, and a battery string that are sequentially connected in series, a plurality of balancing converters, and a shared bus. The battery string includes a plurality of battery units connected in series, and each of the battery units includes one battery pack. The battery pack is connected to an input side of one corresponding balancing converter, and output sides of the plurality of balancing converters are separately connected to the shared bus. A positive terminal of the battery string is connected to the string-level converter, and a negative terminal of the battery string is connected to a reference ground. The string-level converter is configured to: modulate a voltage on the first bus to a charging voltage, to charge the battery string; or modulate a voltage of the battery string to a discharging voltage, to charge a load coupled to the first bus. Each of the balancing converters is configured to: when the balancing converter operates in a first working mode, balance a current of a connected battery pack; and when the balancing converter operates in a second working mode, modulate a voltage of the shared bus to a charging voltage, to charge the connected battery pack; or modulate the voltage of the connected battery pack to a discharging voltage, and output the discharging voltage to the connected shared bus. The shared bus is connected to one of the at least one backup converter by using one of the switch units; and the shared bus and the one backup converter are conducted if the switch unit is in a first state, or the shared bus and the one backup converter are not conducted if the switch unit is in a second state. The backup converter is connected to a first bus in one of the plurality of energy storage branches; and is configured to modulate a voltage on the connected first bus to a charging voltage, to charge a battery string in the connected energy storage branch; or modulate a voltage of a battery string in the connected energy storage branch to a discharging voltage, to charge a load coupled to the connected first bus. The control circuit is separately coupled to each switch unit and each energy storage branch, and is configured to: when the control circuit determines that any component in a first energy storage branch in the plurality of energy storage branches is faulty, control a first switch unit connected to a shared bus in the first energy storage branch to be in the first state, so that the shared bus in the first energy storage branch and the backup converter are conducted by using the first switch unit; and control an operating mode of each balancing converter in the first energy storage circuit to switch from the first working mode to the second working mode, where the first switch unit is a switch unit connected to the shared bus in the first energy storage branch. The any component includes a battery pack and/or a string-level converter, and the first energy storage branch is any one of the plurality of energy storage branches.

In this embodiment of this application, the control circuit may control a switch unit between a shared bus in an energy storage branch including a faulty component and a backup converter to be in the first state, so that a battery string in the energy storage branch including the faulty component can be charged or discharged by using the backup converter. This can improve availability of a battery string in an energy storage branch in a string-level converter is faulty or availability of a non-faulty battery pack in an energy storage branch in which any battery pack is faulty, and can also improve operating efficiency and system reliability that exist when a component in the energy storage system is faulty.

In one embodiment, the switch unit includes a plurality of switches, and the shared bus includes a positive bus and a negative bus. A first switch in the plurality of switches is connected between the positive bus and a first terminal of the one backup converter, and a second switch in the plurality of switches is connected between the negative bus and a second terminal of the one backup converter. When the first switch and the second switch are both in an on state, the switch unit is in the first state; or when the first switch and the second switch are both in an off state, the switch unit is in the second state.

In one embodiment, the switch unit includes one switch, the shared bus includes a positive bus and a negative bus, and the negative bus is connected to a reference ground. The switch is connected between the positive bus and a first terminal of the one backup converter.

In one embodiment, the any component is a first battery pack in the first energy storage branch, and the first battery pack is any battery pack in a battery string in the first energy storage branch. The control circuit is further configured to: control the string-level converter in the first energy storage branch to stop working, so that the battery string and a first bus in the first energy storage branch are open-circuited; control the first switch unit to be in the first state, so that the shared bus in the first energy storage branch and a backup converter connected to the first switch unit are conducted; control a balancing converter connected to the first battery pack to stop working, so that the first battery pack and the shared bus in the first energy storage branch are not conducted; and control balancing converters respectively connected to battery packs in the first energy storage branch other than the first battery pack, to switch from the first working mode to the second working mode.

In this embodiment of this application, because a balancing converter corresponding to a faulty battery pack stops working, the faulty battery pack and a shared bus in an energy storage branch to which the faulty battery pack belongs are not conducted. The control circuit controls the switch unit between the shared bus in the first energy storage branch and the backup converter to be in the first state, to charge or discharge a non-faulty battery pack in the faulty energy storage branch by using the backup converter. This can improve availability of a battery pack in the branch; and can also improve operating efficiency and system reliability that exist when a component in the energy storage system is faulty, and avoid a waste of non-faulty battery pack resources in the faulty energy storage branch.

In one embodiment, the battery unit in the energy storage system further includes a third switch and a fourth switch. The third switch is connected in series to the battery pack in the battery unit to form a first branch; the fourth switch is connected in parallel to the first branch; and the battery pack in the battery unit is short-circuited if the fourth switch is in an on state, or the battery pack in the battery unit is not short-circuited if the fourth switch is in an off state. Two neighboring battery units are conducted if a third switch in a previous battery unit in the two battery units is in an on state, or the two battery units are not conducted if the third switch in the previous battery unit is in an off state. The control circuit is further configured to: control a third switch in a battery unit to which the first battery pack belongs to be in the off state and a fourth switch to be in the on state if a first battery pack in the first energy storage branch is faulty; control the string-level converter in the first energy storage branch to stop working, so that a battery string and a first bus in the first energy storage branch are open-circuited; control the first switch unit to be in the first state, so that the first energy storage branch and the backup converter are conducted by using the first switch unit; and control a balancing converter corresponding to a battery pack in the first energy storage branch other than the first battery pack to switch from the first working mode to the second working mode.

In this embodiment of this application, the control circuit controls the third switch in the battery unit to which the faulty first battery pack belongs to be in the off state and the fourth switch to be in the on state. In this way, the first battery pack can be isolated from the battery string to which the faulty first battery pack belongs, or no current can be transmitted between the first battery pack and the connected balancing converter, so that the first battery pack and the shared bus in the energy storage branch to which the first battery pack belongs are not conducted.

In one embodiment, each of the energy storage branches further includes a circuit protection component. A terminal of the circuit protection component is connected to the battery string, another terminal is connected to the string-level converter, and the circuit protection component is configured to perform overload protection on the energy storage branch. In this embodiment of this application, the circuit protection component disposed in each of the energy storage branches may perform overload protection on a circuit to which the energy storage branch belongs. This improves circuit operating safety.

In one embodiment, the string-level converter includes a direct current/direct current converter, or the string-level converter includes a direct current/alternating current converter. In this embodiment of this application, a string-level converter in each of the energy storage branches may be a direct current/direct current converter, so that the energy storage system can be applied to a direct current scenario. The string-level converter in each of the energy storage branches may be a direct current/alternating current converter, so that the energy storage system can be applied to an alternating current scenario.

DESCRIPTION OF EMBODIMENTS

When a battery string in an energy storage system or a battery pack in the battery string is faulty or fails, the battery string in a faulty circuit does not operate or stops operating, reducing operating efficiency of the energy storage system. If a backup battery string is disposed in the energy storage system to avoid a decrease in the operating efficiency of the energy storage system, material costs of the energy storage system increase. In addition, the backup battery string further needs to be periodically charged and discharged, to prevent damage to batteries caused by a lack of electricity. As a result, costs of maintaining the backup battery string are increased.

Figure 1:
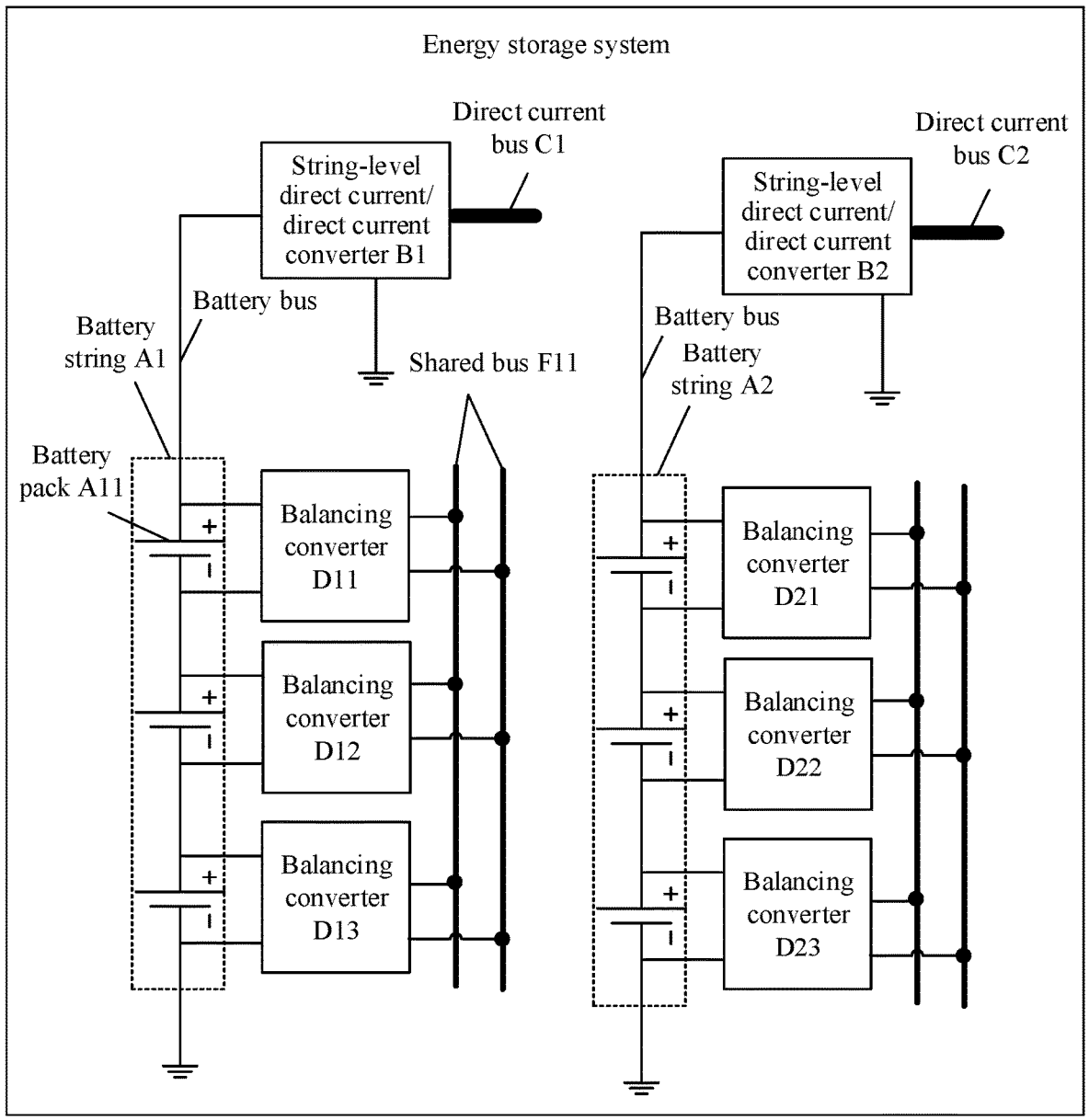
FIG. 1 is a schematic diagram of a structure of an energy storage system.
Figure 2:
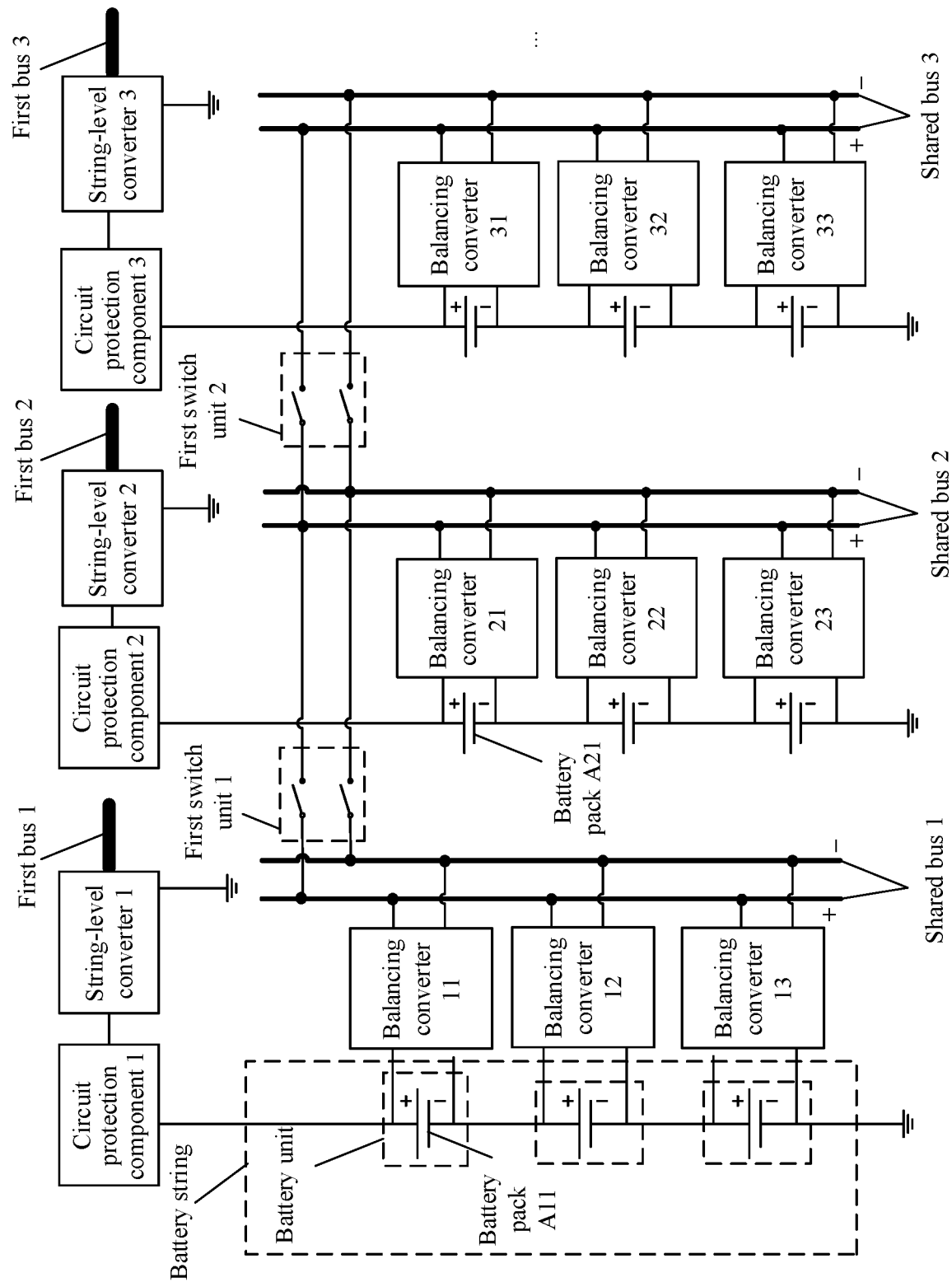
FIG. 2 is a schematic diagram of a structure of an energy storage system according to an embodiment of this application.

An embodiment of this application provides an energy storage system, to improve operating efficiency and system reliability that exist when a component in the energy storage system is faulty. Refer to FIG. 2. The energy storage system may include a plurality of energy storage branches (for example, N energy storage branches, where N is an integer greater than 1), at least one switch unit, and a control circuit. Although FIG. 2 shows three energy storage branches denoted as an energy storage branch 1, an energy storage branch 2, and an energy storage branch 3, a quantity of the energy storage branches shown in FIG. 2 is merely an example, and does not constitute a limitation on a quantity of energy storage branches in the energy storage system provided in this application.

Each of the energy storage branches may include a string-level converter, a first bus, one battery string, a plurality of balancing converters, and a shared bus. The first bus, the string-level converter, and the battery string are sequentially connected in series. A positive input terminal of the battery string may be connected to the string-level converter, and a negative input terminal of the battery string may be connected to a reference ground. In one embodiment, each of the energy storage branches may further include a circuit protection component. A terminal of the circuit protection component may be connected to the string-level converter, and another terminal may be connected to the battery string. The circuit protection component may be configured to perform overload protection on the energy storage branch in which the circuit protection component is located. For example, the circuit protection component may include elements such as a fuse and a circuit breaker.

The string-level converter may include one or more direct current/direct current converters. The first bus may be a direct current bus. The plurality of direct current/direct current converters may be connected in series or in parallel if the string-level converter includes a plurality of direct current/direct current converters. For example, the string-level converter may include but is not limited to one or more of the following circuits: a linear voltage regulated power supply circuit, a buck converter, a boost converter, a buck-boost converter, a switched-capacitor converter, an LLC resonant converter, a dual active bridge (DAB) converter, a forward converter, and a flyback converter, a half-bridge push-pull circuit, a full-bridge push-pull circuit, a full-bridge phase-shift converter, and the like. Examples are not elaborated in embodiments of this application. In one embodiment, the string-level converter may include one or more bidirectional direct current/direct current converters.

The string-level converter may include a direct current/alternating current converter. The string-level converter may convert an alternating current at the connected first bus to a direct current, and provide the direct current to the connected battery string, so as to charge the connected battery string. The string-level converter may convert a direct current provided by the connected battery string to an alternating current, and provide the alternating current to a connected load through the connected first bus. In one embodiment, the string-level converter may include a bidirectional direct current/alternating current converter.

The control circuit may be connected to a control terminal of the string-level converter, and may control the string-level converter to perform voltage modulation (conversion). The string-level converter usually includes one or more switch transistors, and the control terminal of the string-level converter may include control electrodes (gates) of these switch transistors. The control circuit may be a logic circuit having a logic operation capability, can generate a control signal, and separately control on or off of each of the switch transistors in the string-level converter based on the control signal, so as to control the string-level converter to perform voltage conversion. A topology structure of the string-level converter may usually be a non-isolated circuit.

The first bus, the string-level converter, and the battery string in the energy storage branch may form a charging loop or a discharging loop. For example, the first bus, the string-level converter, and the battery string in the energy storage branch may form a charging loop when the first bus is connected to an external power supply. The string-level converter may modulate a voltage on the first bus to a charging voltage, and output the modulated voltage to the battery string, so that an external power supply charges the battery string, that is, the battery string is charged.

For another example, the first bus, the string-level converter, and the battery string in the energy storage branch may form a discharging loop when the first bus is connected to a load. The string-level converter may modulate a voltage of the battery string to a discharging voltage, and provide the modulated voltage to the load through the first bus, so that the battery string in the energy storage branch discharges electricity or supplies power to the load, that is, the battery string charges the load.

The battery string may include a plurality of battery units connected in series. The plurality of battery units may one-to-one correspond to the plurality of balancing converters. Each of the battery units may include one battery pack. It may be understood that a balancing converter corresponding to a battery unit is also a balancing converter corresponding to a battery pack included in the battery unit. A battery pack in each of the battery units may be connected to an input terminal of a corresponding balancing converter, and an output terminal of each of the balancing converters is connected to the shared bus. The energy storage branch 1 is used as an example. There is a one-to-one correspondence between the plurality of battery packs and the plurality of balancing converters. For example, a balancing converter 11 is connected to a corresponding battery pack 1 (which is also a battery pack A11 shown in FIG. 2), and a balancing converter 12 is connected to a corresponding battery pack 2. The balancing converter 13 is connected to a corresponding battery pack 3.

Each of the balancing converters may be connected to a corresponding battery pack in parallel. For example, a positive input terminal on an input side of a balancing converter is connected to a positive electrode of a corresponding battery pack, and a negative input terminal on the input side of the balancing converter is connected to a negative electrode of the corresponding battery pack.

The balancing converter may include one or more direct current/direct current converters connected in series or in parallel. For example, the balancing converter may include but is not limited to one or more of the following circuits: an LLC resonant converter, a DAB converter, a forward converter, a flyback converter, a half-bridge push-pull circuit, a full-bridge push-pull circuit, a full-bridge phase-shift converter, and the like. Examples are not elaborated in embodiments of this application. A topology structure of the balancing converter may usually be an isolated circuit.

Each of the balancing converters may be a bidirectional direct current/direct current converter. For example, the balancing converter may be a bidirectional direct current/direct current converter. An output side of each of the balancing converters is connected to the shared bus. The shared bus may include a positive first bus and a negative first bus. A positive output terminal on the output side of the balancing converter is connected to the positive first bus, and a negative output end on the output side of the balancing converter is connected to the negative first bus.

When a balancing converter does not work or stops working, an open circuit occurs between a battery pack corresponding to the balancing converter and a shared bus. When the balancing converter works, the balancing converter may have a plurality of working modes, or may have a plurality of functions.

When the balancing converter is in a first working mode (or the balancing converter operates in the first working mode), the balancing converter may be configured to balance a current of a corresponding battery pack. The balancing converter and the corresponding battery pack may form a balancing loop. When there is no faulty component in the energy storage branch, each of the balancing converters in the energy storage branch may adjust a current of a corresponding battery pack, to balance the current of the battery packs.

When the balancing converter is in a second working mode (or the balancing converter operates in the second working mode), the balancing converter, the battery pack corresponding to the balancing converter, and the connected shared bus may form a charging loop or a discharging loop. For example, there is a faulty component in the energy storage branch. When the balancing converter may be configured to form a charging loop, the balancing converter may modulate a voltage on the shared bus to a charging voltage, and output the modulated voltage to the battery pack corresponding to the balancing converter, so as to charge the corresponding battery pack, that is, the battery pack is charged. In other words, the balancing converter may absorb power from the shared bus, or obtain electric energy from the shared bus, and provide the power or the electric energy to the corresponding battery pack.

For another example, there is a faulty component in the energy storage branch. When the balancing converter may be configured to form a discharging loop, the balancing converter may modulate a voltage of the corresponding battery pack to a discharging voltage, and output the discharging voltage to the connected shared bus, so that the battery pack discharges electricity to the shared bus. In other words, the balancing converter may output power to the shared bus, and output electric energy of the corresponding battery pack to the shared bus.

The control circuit may be connected to a control terminal of the balancing converter, and may control the balancing converter to switch a working mode or stop working. The balancing converter usually includes one or more switch transistors, and the control terminal of the balancing converter may include control electrodes (gates) of these switch transistors. The control circuit may be a logic circuit having a logic operation capability, can generate a control signal, and separately control on or off of each of the switch transistors in the balancing converter based on the control signal, so as to control the balancing converter to switch a working mode or stop working.

One switch unit is disposed between shared buses in two neighboring energy storage branches. The shared buses in the two neighboring energy storage branches are coupled to each other by using the corresponding switch unit. As shown in FIG. 2, a shared bus 1 in the energy storage branch 1 is connected to a shared bus 2 in the energy storage branch 2 by using a first switch unit 1. The control circuit may be coupled to each switch unit, and may control a switch unit to be in a first state or a second state.

The shared buses in the two neighboring energy storage branches are conducted if the switch unit between the shared buses in the two neighboring energy storage branches is in the first state. A current may flow from one shared bus to the other shared bus if the two shared buses are conducted. For example, the shared bus 1 and the shared bus 2 are conducted if the first switch unit 1 is in the first state. The current may flow from the shared bus 1 to the shared bus 2, or flow from the shared bus 2 to the shared bus 1.

The shared buses in the two neighboring energy storage branches are not conducted if the switch unit between the shared buses in the two neighboring energy storage branches is in the second state. The current cannot flow from one shared bus to the other shared bus if the two shared buses are not conducted. For example, the shared bus 1 and the shared bus 2 are not conducted if the first switch unit 1 is in the second state. A current on the shared bus 1 cannot flow to the shared bus 2, and a current on the shared bus 2 cannot flow to the shared bus 1.

In one embodiment, the shared bus may include a positive direct current bus and a negative direct current bus. Each switch unit may include a plurality of switches. In the first switch unit, a first switch is connected between positive direct current buses of two shared buses, and a second switch is connected between negative direct current buses of the two direct current buses. The control circuit may be coupled to the switches in each first switch unit. The control circuit may control the switches to be in an on or off state. The control circuit may control all switches in the first switch unit to be in an on state, so that the first switch unit is in the first state. The control circuit may also control all the switches in the first switch unit to be in an off state, so that the first switch unit is in the second state.

The control circuit may be separately coupled to a plurality of energy storage branches, to detect a faulty component in each of the energy storage branches. If there is no faulty component in each of the energy storage branches, the control circuit may control each switch unit to be in the second state, or may control each of the balancing converters to operate in the first working mode. Each of the energy storage branches may operate independently. A battery string in the energy storage branch may provide electric energy, and is configured to supply power to a load connected to the energy storage branch. The battery string in the energy storage branch may store electric energy, and is configured to store electric energy provided by an external power supply connected to the energy storage branch.

In a possible case, the control circuit may determine that there is no faulty component in each of the energy storage branches in the energy storage system, and the control circuit may control each first switch unit to be in the second state. In one embodiment, a switch in each first switch unit is in an off state, so that each switch unit is in the second state, and a shared bus in each of the energy storage branches and a shared bus in another energy storage branch are also open-circuited, that is, are not conducted.

In another possible case, the control circuit may detect that at least one energy storage branch is faulty. A possible fault case is that a string-level converter in the at least one energy storage branch is faulty, that is, the control circuit may detect that a faulty component in the at least one energy storage branch is the string-level converter. The control circuit may migrate a battery string in a faulty energy storage branch to a non-faulty energy storage branch, and performs charging or discharging by using the non-faulty energy storage branch. For ease of description, the faulty energy storage branch is denoted as a first energy storage branch.

The battery string in the first energy storage branch and a string-level converter in the first energy storage branch cannot form a charging loop or a discharging loop when the string-level converter is faulty. The control circuit may control a switch unit between a shared bus in an energy storage branch neighboring the first energy storage branch (denoted as a second energy storage branch) and a shared bus in the first energy storage branch to be in a first state; and control each of balancing converters in the first energy storage branch to be in a second working mode.

For example, when a string-level converter in the energy storage branch 2 is faulty, the control circuit may control the first switch unit 1 to be in the first state, so that the shared bus 2 in the energy storage branch 2 and the shared bus 1 in the energy storage branch 1 may be conducted. Alternatively, the control circuit may control the first switch unit 2 to be in the first state, so that the shared bus 2 in the energy storage branch 2 and the shared bus 3 in the energy storage branch 3 are conducted. The control circuit controls each of balancing converters in the energy storage branch 2 to be in the second working mode. The following provides description by using an example in which the control circuit controls the first switch unit 1 to be in the first state.

When the first switch unit 1 is in the first state, and each of the balancing converters in the energy storage branch 2 is in the second working mode, the shared bus 2, the balancing converters, and the battery packs in the energy storage branch 2, and the energy storage branch 1 may form a charging loop or a discharging loop. Because the first switch unit 1 is in the first state, the shared bus 1 and the shared bus 2 are conducted. Currents on the shared bus 1 and the shared bus 2 may be transmitted to each other. For example, when the shared bus 2, the balancing converters, and the battery packs in the energy storage branch 2 may form a charging loop, if there is a current on the shared bus 1 in the energy storage branch 1, the current may flow to the shared bus 2. Each of the balancing converters in the energy storage branch 2 may modulate a voltage on the shared bus 2 to a charging voltage, and output the modulated voltage to a battery pack corresponding to the balancing converter, so as to charge the corresponding battery pack, that is, the battery pack is charged.

For another example, when the balancing converters in the energy storage branch 2 are in the second working mode, and the shared bus 2, the balancing converters, and the battery packs in the energy storage branch 2 may form a discharging loop, the balancing converters in the energy storage branch 2 each may modulate a voltage of a corresponding battery pack to a discharging voltage, and output the modulated voltage to the shared bus 2. Because the shared bus 2 and the shared bus 1 are conducted, electric energy on the shared bus 2 may be transmitted to the shared bus 1. Each of the balancing converters in the energy storage branch 1 may transmit electric energy on the shared bus 1 to a connection line between the battery string and the string-level converter 1. The string-level converter 1 may modulate the electric energy, and output a modulated voltage to the first bus 1, to supply power to a load.

It should be understood that, a loop may be formed between the battery packs in the energy storage branch 2, the balancing converters corresponding to the battery packs, the shared bus 2, the first switch unit, the shared bus 1, the balancing converters in the energy storage branch 1, the string-level converter in the energy storage branch 1, and the first bus in the energy storage branch 1. Each of the battery packs in the energy storage branch 2 may be charged or discharged through the loop.

In one embodiment, each of battery packs in an energy storage branch in which a string-level converter is faulty may output power or absorb power, that is, may be discharged or charged, by using a neighboring non-faulty energy storage branch. The control circuit controls a switch unit between shared buses of two neighboring energy storage branches to be in the first state, to charge or discharge, by using a non-faulty energy storage branch, a battery string in an energy storage branch in which a string-level converter is faulty. This can improve availability of the battery string in the energy storage branch in which the string-level converter is faulty, avoid a waste of battery string resources, and can also improve operating efficiency and system reliability that exist when a component in the energy storage system is faulty.

In another possible fault case, at least one battery pack in a battery string in the at least one energy storage branch is faulty. The control circuit may migrate a normal battery pack in the faulty energy storage branch to a non-faulty energy storage branch, and perform charging or discharging by using the non-faulty energy storage branch.

A string-level converter in a first energy storage branch cannot form a charging loop or a discharging loop with a battery string in the first energy storage branch if at least one battery pack in the battery string is faulty. The control circuit may control a switch unit between a shared bus in a second energy storage branch (an energy storage branch neighboring the first energy storage branch) and a shared bus in the first energy storage branch to be in the first state; and control a balancing converter corresponding to the non-faulty battery pack in the first energy storage branch to be in the second working mode, and control a balancing converter corresponding to the faulty battery pack in the first energy storage branch to stop working.

For example, when a battery pack A21 in the energy storage branch 2 is faulty, the control circuit may control the first switch unit 1 to be in the first state, so that the shared bus 2 in the energy storage branch 2 and the shared bus 1 in the energy storage branch 1 are conducted. Alternatively, the control circuit may control the first switch unit 2 to be in the first state, so that the shared bus 2 in the energy storage branch 2 and the shared bus 3 in the energy storage branch 3 are conducted. The control circuit controls a balancing converter corresponding to another battery pack in the energy storage branch 2 other than the battery pack A21 (a non-faulty battery pack) to be in the second working mode; and controls the balancing converter 21 corresponding to the battery pack A21 to stop working. The following uses an example in which the control circuit controls the first switch unit 1 to be in the first state.

When the first switch unit 1 is in the first state, and a balancing converter corresponding to each of non-faulty battery packs in the energy storage branch 2 is in the second working mode, the balancing converter 21 corresponding to the battery pack A21 stops working, the shared bus 2 in the energy storage branch 2, the balancing converters corresponding to the non-faulty battery packs, the non-faulty battery packs, and the energy storage branch 1 may form a charging loop or a discharging loop. Because the first switch unit 1 is in the first state, the shared bus 1 and the shared bus 2 are conducted, and the currents on the shared bus 1 and on the shared bus 2 may be transmitted to each other. For example, when the shared bus 2 in the energy storage branch 2, the balancing converters corresponding to the non-faulty battery packs, and the non-faulty battery packs may form a charging loop, if there is a current on the shared bus 1 in the energy storage branch 1, the current may flow to the shared bus 2. A balancing converter corresponding to each of the non-faulty battery packs in the energy storage branch 2 may modulate a voltage on the shared bus 2 to a charging voltage, and output the modulated voltage to a battery pack corresponding to the balancing converter, so as to charge the corresponding battery pack, that is, the non-faulty battery packs are charged.

For another example, when the balancing converter corresponding to each of the non-faulty battery packs in the energy storage branch 2 is in the second working mode, and the shared bus 2 in the energy storage branch 2, the balancing converters corresponding to the non-faulty battery packs, and the non-faulty battery packs can form a discharging loop, the balancing converter corresponding to each of the non-faulty battery packs in the energy storage branch 2 may modulate a voltage of a corresponding battery pack to a discharging voltage, and output the modulated voltage to the shared bus 2. Because the shared bus 2 and the shared bus 1 are conducted, electric energy on the shared bus 2 may be transmitted to the shared bus 1. Each of the balancing converters in the energy storage branch 1 may transmit electric energy on the shared bus 1 to a connection line between the battery string and the string-level converter 1. The string-level converter 1 may modulate the electric energy, and output a modulated voltage to the first bus 1, to supply power to a load.

In one embodiment, because the balancing converter corresponding to the battery pack A21 in the energy storage branch 2 stops working, the battery pack A21 and the shared bus 2 are open-circuited, so that the battery pack A21 is isolated from the charging loop or the discharging loop. Each of the non-faulty battery packs in the faulty energy storage branch may output power or absorb power, that is, may be discharged or charged, by using a neighboring non-faulty energy storage branch. The control circuit controls a switch unit between shared buses of two neighboring energy storage branches to be in the first state, to charge or discharge a non-faulty battery pack in the faulty energy storage branch by using a non-faulty energy storage branch. This can improve availability of the non-faulty battery pack in the energy storage branch, and can also improve operating efficiency and system reliability that exist when a component in the energy storage system is faulty.

It should be understood that a loop may be formed between the non-faulty battery packs in the energy storage branch 2, the balancing converters corresponding to the non-faulty battery packs, the shared bus 2, the first switch unit, the shared bus 1, the balancing converters in the energy storage branch 1, the string-level converter in the energy storage branch 1, and the first bus in the energy storage branch 1. Each of the non-faulty battery packs in the energy storage branch 2 may be charged or discharged through the loop.

Figure 3:
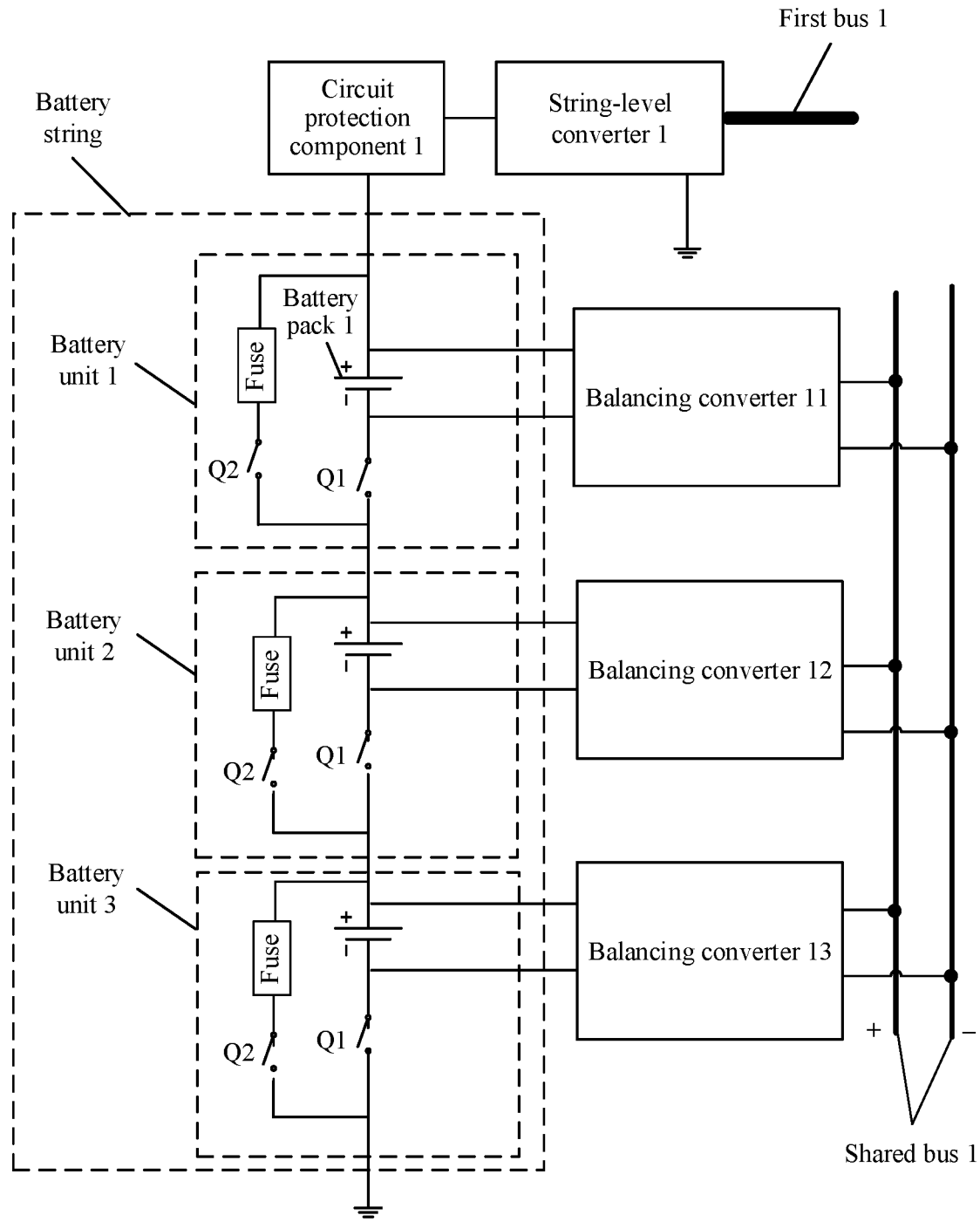
FIG. 3 is a schematic diagram of a structure of an energy storage branch according to an embodiment of this application.

In one embodiment, each of the battery units may further include a third switch and a fourth switch. Refer to FIG. 3. A third switch Q1 in each switch unit may be connected in series to a battery pack. The third switch Q1 and the battery pack are connected in series to form a first branch. A fourth switch Q2 in the battery unit is connected in parallel to the first branch. A balancing converter corresponding to the battery pack (which is also a balancing converter corresponding to the battery unit) may be connected in parallel to the battery pack or the first branch.

The battery pack in the battery unit is short-circuited if the fourth switch Q2 is in an on state. The battery pack in the battery unit is not short-circuited if the fourth switch Q2 is in an off state. In one embodiment, the fourth switch Q2 may be connected in series to a circuit protection element. For example, the fourth switch Q2 is connected in parallel to the first branch after being connected in series to the circuit protection element. For example, the circuit protection element may be a fuse or an element having functions that are the same as or similar to those of the fuse.

Two neighboring battery packs are conducted if a third switch Q1 in a previous battery unit in two neighboring battery units is in an on state. The two neighboring battery packs are open-circuited if the third switch Q1 in the previous battery unit in the two battery units is in an off state. The control circuit may be connected to the third switch Q1 and the fourth switch Q2 in each of the battery units, and may control each of the switches to be in an on or off state.

Usually, when there is no faulty battery pack in an energy storage branch, a fourth switch Q2 in each of battery units is in an off state, and a third switch Q1 is in an on state. In this case, each of battery packs is connected between a string-level converter and a reference ground.

In embodiments of this application, the plurality of battery units may be sequentially arranged when the plurality of battery units in the battery string are connected in series. If a battery pack in a battery unit in a battery string is faulty, the control circuit may control a fourth switch Q2 in the battery unit to be in an on state, and control a third switch Q1 in the battery unit to be in an off state, so that the faulty battery pack is short-circuited. In this case, no current is transmitted between the battery pack and a corresponding balancing converter, so that the battery pack and a shared bus in an energy storage branch to which the battery pack belongs are not conducted.

It is assumed that a battery pack in a battery unit 2 in the energy storage branch 1 is faulty, the control circuit controls a third switch Q1 in the battery unit 2 to be in an off state and controls a fourth switch Q2 to be in an on state, so that the battery pack in the battery unit 2 is short-circuited. In this case, two battery packs in the battery unit 1 and the battery unit 3 may be connected in series. In one embodiment, the battery pack in the battery unit 2 can be isolated from the battery string, and no current is transmitted between the battery pack in the battery unit 2 and the corresponding balancing converter 12. In this case, no current is transmitted between the battery pack in the battery unit 2 and the shared bus 1 in the energy storage branch 1, that is, the battery pack in the battery unit 2 and the shared bus 1 are not conducted. This facilitates management on a non-faulty battery pack in the battery string in the energy storage branch 1.

Figure 4:
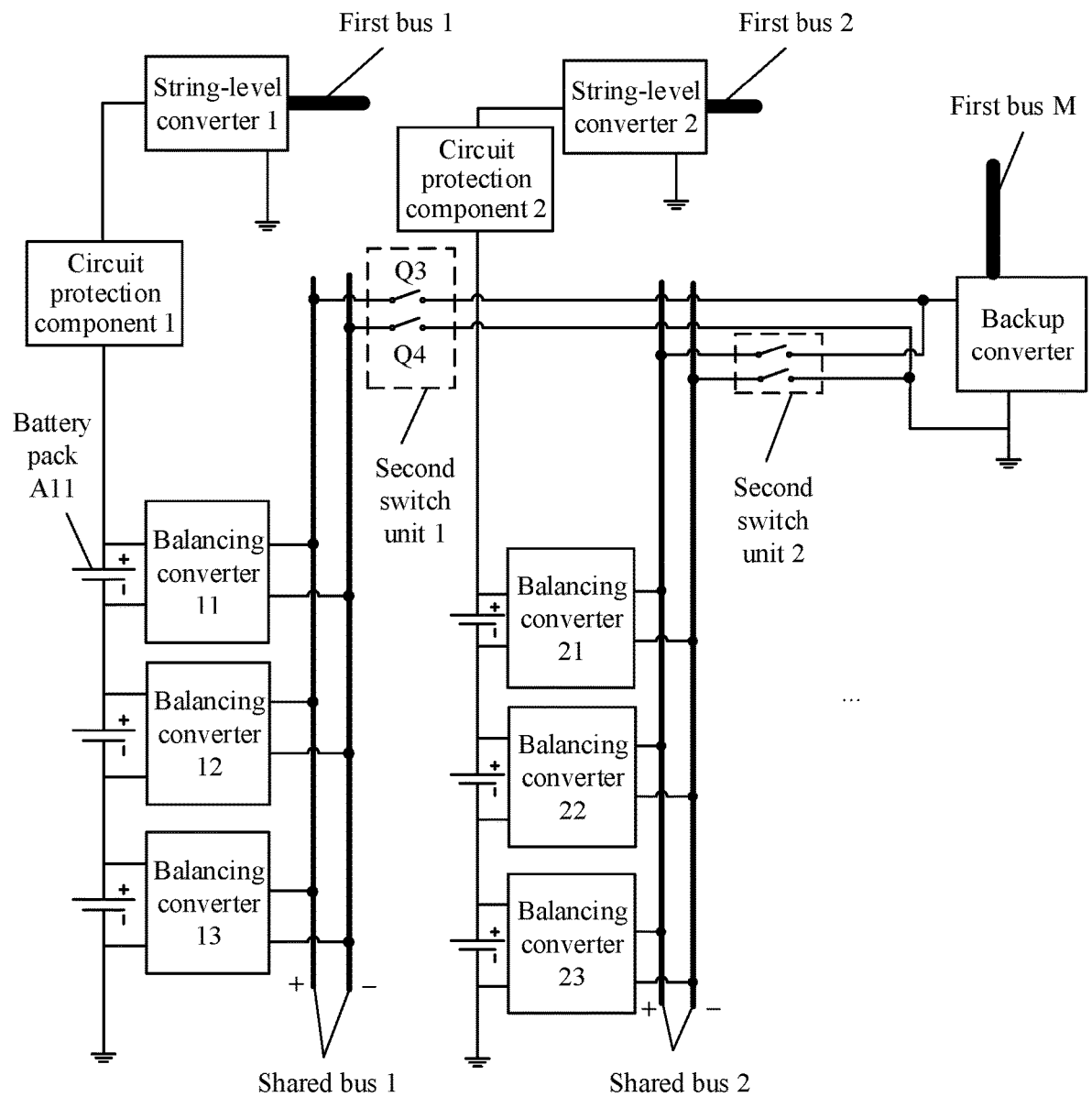
FIG. 4 is a schematic diagram of a structure of another energy storage system according to an embodiment of this application.

An embodiment of this application provides another energy storage system. As shown in FIG. 4, the energy storage system may include at least one energy storage branch, at least one second switch unit, at least one backup converter, and a control circuit. For a structure of each energy storage branch in this embodiment of this application, refer to the structure of the energy storage branch in the foregoing embodiment. Details are not described herein again.

A shared bus in each energy storage branch may be connected to one or more second switch units. A second switch unit connected to a shared bus in an energy storage branch may be denoted as a second switch unit corresponding to the energy storage branch, or may be denoted as a switch unit corresponding to the shared bus in the energy storage branch. A terminal of each second switch unit is connected to a corresponding shared bus, and another terminal is connected to a backup converter. When the second switch unit is in a first state, the shared bus connected to the second switch unit and the connected backup converter are conducted. When the second switch unit is in a second state, the shared bus connected to the second switch unit and the connected backup converter are open-circuited, that is, are not conducted.

In an example, when the energy storage system includes one backup converter, one second switch unit is disposed between the shared bus in each energy storage branch and the backup converter. That is, one second switch unit is connected between the shared bus in each energy storage branch and the backup converter. There is a correspondence between one second switch unit and a shared bus in one energy storage branch. One second switch unit is connected to a shared bus in only one energy storage branch, and a shared bus in one energy storage branch is also connected to only one second switch unit.

As shown in FIG. 4, a second switch unit 1 is disposed between a shared bus 1 in an energy storage branch 1 and the backup converter, and a second switch unit 2 is disposed between a shared bus 2 and the backup converter. The shared bus 1 and the backup converter are conducted if the second switch unit 1 is in a first state. The shared bus 1 and the backup converter are open-circuited if the second switch unit 1 is in a second state. Similarly, the shared bus 2 and the backup converter are conducted if the second switch unit 2 is in the first state. The shared bus 2 and the backup converter are open-circuited if the second switch unit 2 is in the second state.

In another example, the energy storage system includes a plurality of backup converters. For example, the plurality of backup converters may include a backup converter 1 and a backup converter 2. A second switch unit is disposed between a shared bus in one energy storage branch and at least one backup converter.

Figure 5:
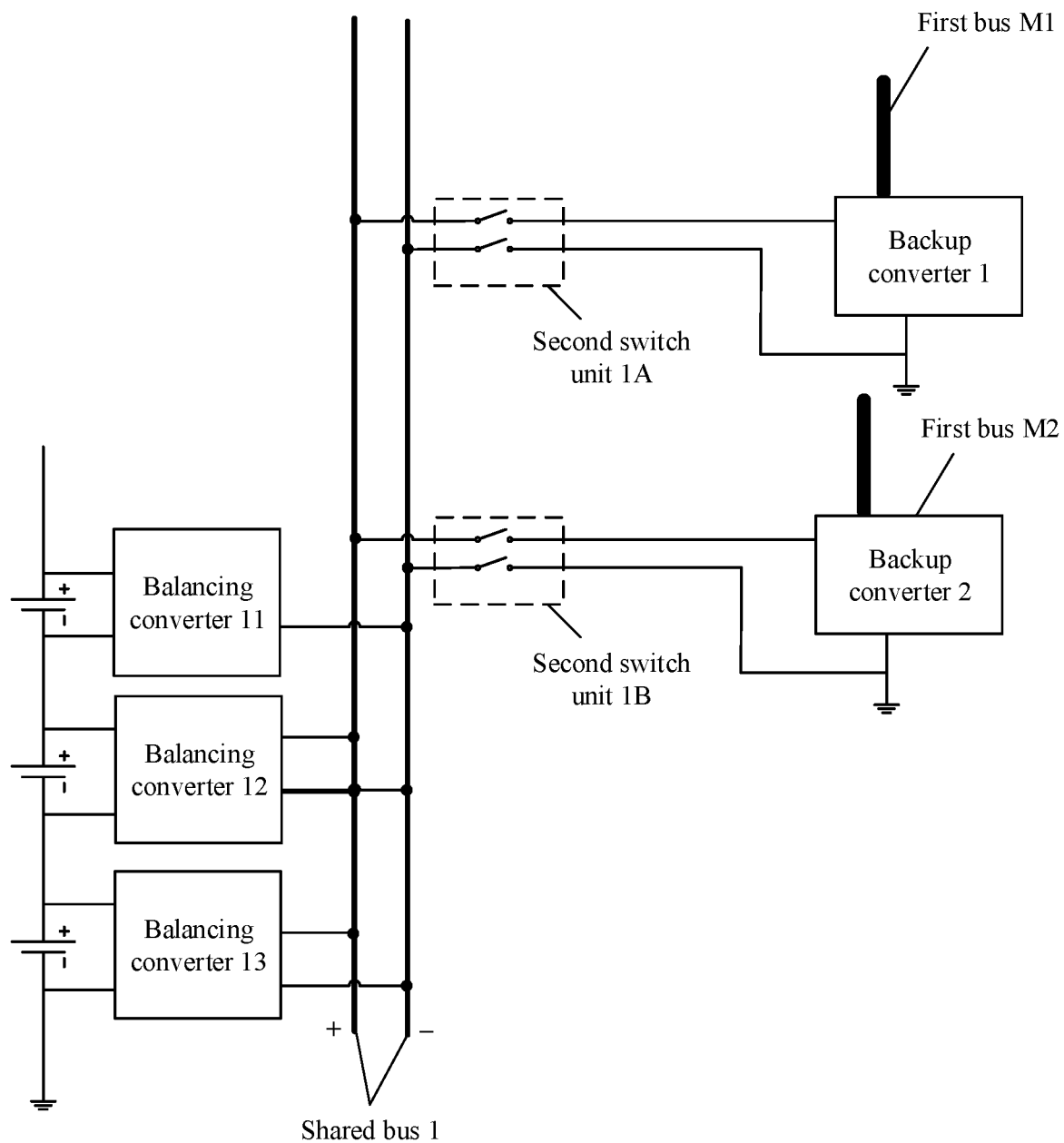
FIG. 5 is a schematic diagram of a connection relationship between an energy storage branch and a backup converter.

For example, a shared bus in one energy storage branch may be connected to a plurality of second switch units, and the second switch units are connected to different backup converters. As shown in FIG. 5, a shared bus 1 in an energy storage branch 1 may be separately connected to a second switch unit 1A and a second switch unit 1B. The second switch unit 1A and the second switch unit 1B are connected to different backup converters. For example, the second switch unit 1A is connected to the backup converter 1, and the second switch unit 1B is connected to the backup converter 2. A shared bus 1 and any backup converter are not conducted if both the second switch unit 1A and the second switch unit 1B are in a second state. The shared bus 1 and one backup converter are conducted if any switch unit in the second switch unit 1A and the second switch unit 1B is in a first state. For example, the shared bus 1 and the backup converter 1 are not conducted if the second switch unit 1A is in the second state.

Figure 6:
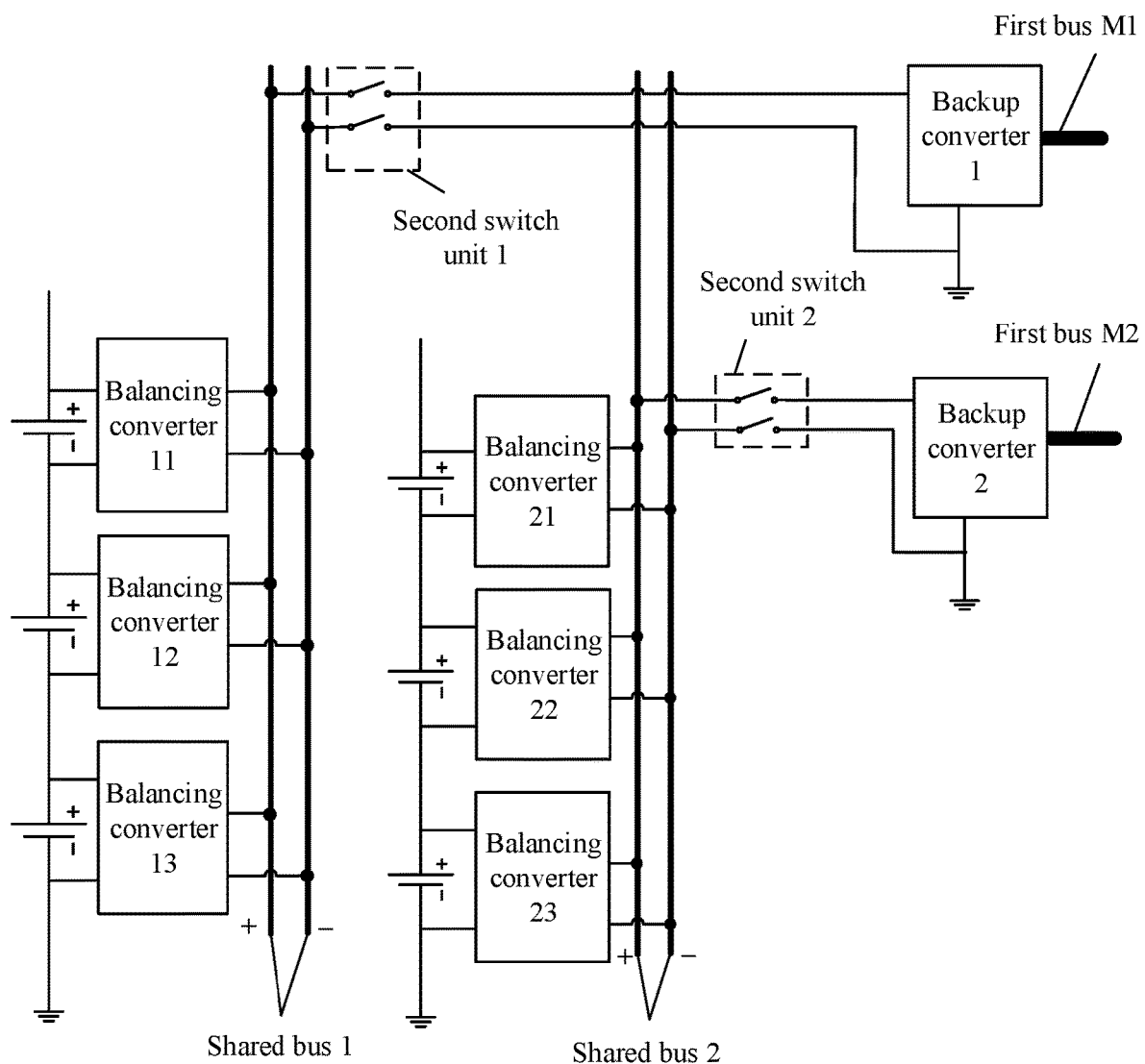
FIG. 6 is a schematic diagram of another connection relationship between an energy storage branch and a backup converter.

For another example, a shared bus in one energy storage branch is connected to one second switch unit, and the second switch unit may be connected to one of a plurality of backup converters. The shared bus and the backup converter are conducted if the second switch unit is in the first state. The shared bus and the backup converter are open-circuited, that is, are not conducted, if the second switch unit is in the second state. The control circuit may be connected to each second switch unit to control a state of each second switch unit. As shown in FIG. 6, one second switch unit, that is, a second switch unit 1, may be disposed between a shared bus 1 in an energy storage branch 1 and a backup converter 1 in a plurality of backup converters. One second switch unit, that is, a second switch unit 2, may be disposed between a shared bus 2 in an energy storage branch 2 and a backup converter 2 in the plurality of backup converters.

Figure 7:
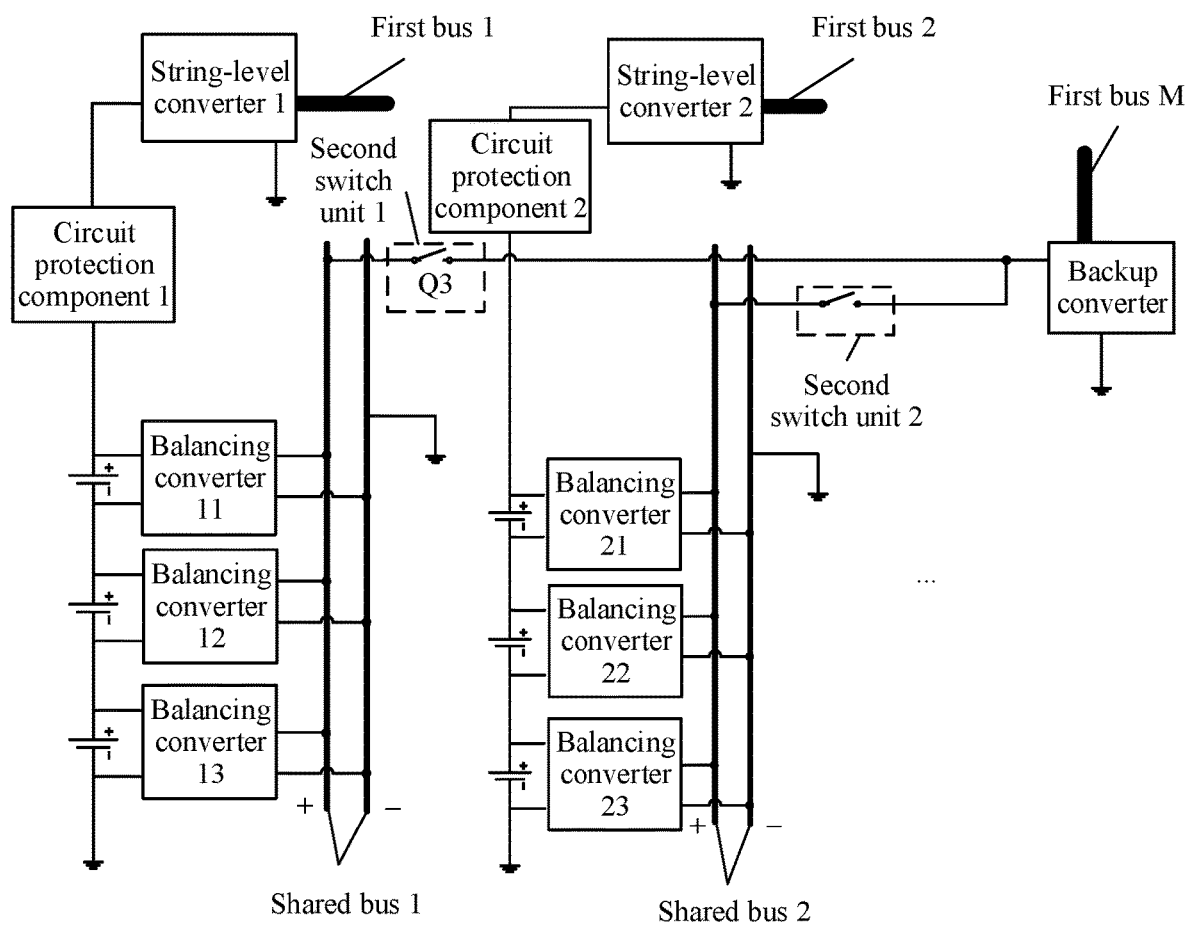
FIG. 7 is a schematic diagram of still another connection relationship between an energy storage branch and a backup converter.

In one embodiment, as shown in FIG. 7, the shared bus may include a positive direct current bus and a negative direct current bus. Each second switch unit may include one switch, for example, a fifth switch Q3. The fifth switch Q3 in each second switch unit is connected between a positive direct current bus of a shared bus and a first terminal of a backup converter. The negative direct current bus of each shared bus is connected to a reference ground.

In one embodiment, as shown in FIG. 4, each second switch unit may include the fifth switch Q3 and a sixth switch Q4. The sixth switch Q4 is connected between a negative direct current bus of a shared bus and a second terminal of the backup converter.

The second terminal of the backup converter is connected to the reference ground. A third terminal of the backup converter may be connected to a first bus in any energy storage branch. For example, a first bus M connected to the third terminal of the backup converter may be connected to a first bus j in any energy storage branch j (where j is a number of the energy storage branch). Alternatively, a first bus Mi connected to a third terminal of a backup converter i (where i is a number of the backup converter) may be connected to a first bus j of any energy storage branch j.

For another example, the energy storage system may further include a second bus. The second bus may not belong to any energy storage branch. The second bus may be connected to an external power supply or a load. The first bus M connected to the third terminal of the backup converter may be connected to the second bus. Alternatively, the first bus Mi connected to the third terminal of the backup converter i may be connected to the second bus.

The control circuit is coupled to the switches in the second switch units, and can control the switches to be in an on or off state. For one second switch unit, the control circuit may control all switches in the second switch unit to be in an on state, so that the second switch unit is in a first state. In this way, a backup converter connected to the second switch unit and a shared bus can be conducted. The control circuit may control all the switches in the second switch unit to be in an off state, so that the second switch unit is in a second state. In this way, the backup converter connected to the second switch unit and the shared bus cannot be conducted.

The control circuit may be separately coupled to a plurality of energy storage branches, to detect a faulty component in each of the energy storage branches. If there is no faulty component in each of the energy storage branches, the control circuit may control each second switch unit to be in the second state, or may control each of the balancing converters to operate in the first working mode. Each of the energy storage branches may operate independently. A battery string in the energy storage branch may provide electric energy, and is configured to supply power to a load connected to the energy storage branch. The battery string in the energy storage branch may store electric energy, and is configured to store electric energy provided by an external power supply connected to the energy storage branch.

The control circuit may be connected to each of the backup converters, and may control the backup converter to be in a third working mode or control the backup converter to stop working. When the backup converter i is in the third working mode, a voltage on the connected first bus Mi may be modulated to a charging voltage, to charge a battery string in a conducted energy storage branch; or a voltage of the battery string in the conducted energy storage branch is modulated to a discharging voltage, to charge a load coupled to the connected first bus Mi.

The backup converter may include one or more direct current/direct current converters. The first bus M connected to the backup converter is a direct current bus. A plurality of direct current/direct current converters may be connected in series or in parallel if the backup converter includes the plurality of direct current/direct current converters. For example, the backup converter may include but is not limited to one or more of the following circuits: a linear voltage regulated power supply circuit, a buck converter, a boost converter, a buck-boost converter, a switched-capacitor converter, an LLC resonant converter, a DAB converter, a forward converter, and a flyback converter, a half-bridge push-pull circuit, a full-bridge push-pull circuit, a full-bridge phase-shift converter, and the like. Examples are not elaborated in embodiments of this application. In one embodiment, a modulation capability of the backup converter may be weaker than a modulation capability of a string-level converter. In other words, a power processing capability of the backup converter may be weaker than a power processing capability of the string-level converter. In one embodiment, the backup converter may include one or more bidirectional direct current/direct current converters.

The backup converter may include a direct current/alternating current converter. The backup converter may convert an alternating current at the connected first bus M to a direct current, and provide the direct current to a connected battery string, so as to charge the connected battery string. The backup converter may convert a direct current provided by the connected battery string to an alternating current, and provide the alternating current to a connected load through the connected first bus M. In one embodiment, the backup converter may include a bidirectional direct current/alternating current converter.

The control circuit may be connected to a control terminal of the backup converter, and may control the backup converter to perform voltage modulation (conversion). Usually, the backup converter includes one or more switch transistors, and the control terminal of the backup converter may include control electrodes (gates) of these switch transistors. The control circuit may be a logic circuit having a logic operation capability, can generate a control signal, and separately control on or off of each of the switch transistors in the backup converter based on the control signal, so as to control the backup converter to perform voltage conversion.

In a possible case, the control circuit may detect that at least one energy storage branch is faulty. A possible fault case is that a string-level converter in the at least one energy storage branch is faulty, that is, the control circuit may detect that a faulty component in the at least one energy storage branch is the string-level converter. The control circuit may charge or discharge a battery string in a faulty energy storage branch (a first energy storage branch) by using a backup converter.

The battery string in the first energy storage branch and a string-level converter in the first energy storage branch cannot form a charging loop or a discharging loop when the string-level converter is faulty. The control circuit may control a second switch unit connected to a shared bus in the first energy storage branch to be in a first state, and control the backup converter connected to the second switch unit to be in a third working mode; and control each of balancing converters in the first energy storage branch to be in a second working mode.

It is assumed that the string-level converter 1 in the energy storage branch 1 is faulty, and the battery string in the energy storage branch 1 cannot be charged or discharged by using the string-level converter 1. As shown in FIG. 4, the control circuit may control the second switch unit 1 connected to the shared bus of the energy storage branch 1 to be in the first state, so that the shared bus 1 and the backup converter are conducted. The control circuit may control each of the balancing converters in the energy storage branch 1 to be in the second working mode, and control the backup converter to be in the third working mode, so that a charging loop or a discharging loop may be formed among the backup converter, the first bus M, and the shared bus 1, the balancing converters, and the battery packs in the energy storage branch 1. Each of the battery packs may be charged by using the formed charging loop, or may be discharged by using the formed discharging loop.

When the first bus M connected to the backup converter is connected to an external power supply, the backup converter may modulate a voltage on the first bus M, and output a modulated voltage to the shared bus 1. Each of the balancing converters in the energy storage branch 1 may modulate a voltage on the shared bus 1 to a charging voltage, and output the modulated voltage to a battery pack corresponding to the balancing converter, so as to charge the corresponding battery pack, that is, the battery pack is charged.

When the first bus M connected to the backup converter is connected to the load, each of the balancing converters in the energy storage branch 1 may modulate a voltage of a corresponding battery pack to a discharging voltage, and output the modulated voltage to the shared bus 1. The backup converter may modulate the voltage on the shared bus 1 to a discharging voltage, output the modulated voltage to the first bus M, and provide the modulated voltage to the load, so that a normal battery string in the energy storage branch 1 supplies power to the load when the string-level converter 1 in the energy storage branch 1 is faulty.

As shown in FIG. 5, in a scenario in which the shared bus 1 in the energy storage branch 1 is connected to a plurality of second switch units, the control circuit may control any one of the plurality of second switch units connected to the shared bus 1 to be in the first state. For example, the control circuit controls a second switch unit 1A in the plurality of second switch units connected to the shared bus 1 to be in the first state, controls each of the balancing converters in the energy storage branch 1 to be in the second working mode, and controls the backup converter 1 to be in the third working mode, so that a charging loop or a discharging loop may be formed among the backup converter 1 (a backup converter connected to the second switch unit 1A), the first bus Ml, and the shared bus 1, the balancing converter, and the battery packs in the energy storage branch 1. Each of the battery packs in the energy storage branch 1 may be charged by using the formed charging loop, or may be discharged by using the formed discharging loop.

In one embodiment, the battery string in the energy storage branch in which the string-level converter is faulty may be charged or discharged by using the backup converter. This can improve availability of the battery string in the energy storage branch in which the string-level converter is faulty, reduce a waste of battery string resources, and can also improve operating efficiency and system reliability that exist when a component in the energy storage system is faulty.

In another possible fault case, at least one battery pack in a battery string in the at least one energy storage branch is faulty. It is assumed that at least one battery pack in a first energy storage branch is faulty. A battery string in the first energy storage branch and a string-level converter cannot form a charging loop or a discharging loop. The control circuit may control a second switch unit connected to a shared bus in the first energy storage branch to be in a first state, and control the backup converter connected to the second switch unit to be in a third working mode; and control a balancing converter corresponding to each of non-faulty battery packs in the first energy storage branch to be in the second working mode, and control a balancing converter corresponding to the faulty battery pack to stop working.

Refer to FIG. 4. It is assumed that a battery pack A11 in the energy storage branch 1 is faulty, and the battery string in the energy storage branch 1 cannot be charged or discharged by using the string-level converter 1. As shown in FIG. 4, the control circuit may control the second switch unit 1 connected to the shared bus of the energy storage branch 1 to be in the first state, so that the shared bus 1 and the backup converter are conducted. The control circuit may control a balancing converter 11 corresponding to the battery pack A11 in the energy storage branch 1 to stop working, control a balancing converter corresponding to another battery pack in the energy storage branch 1 other than the battery pack A11 (a non-faulty battery pack) to be in a second working mode, control the backup converter to be in a third working mode, so that a charging loop or a discharging loop may be formed among the non-faulty battery packs in the energy storage branch 1, balancing converters corresponding to the non-faulty battery packs, the shared bus 1, the backup converter, and the first bus M. Each of the non-faulty battery packets may be charged by using the formed charging loop, or may be discharged by using the formed discharging loop. For the charging loop or the discharging loop for the non-faulty battery pack in the energy storage branch 1, refer to the description in the foregoing embodiment. Details are not described herein again.

In one embodiment, a non-faulty battery pack in a faulty energy storage branch is charged or discharged by using a non-faulty energy storage branch. This can improve availability of the battery pack in the branch, reduce a waste of battery pack resources, and can also improve operating efficiency and system reliability that exist when a component in the energy storage system is faulty.

In one embodiment, in the energy storage system provided in this embodiment of this application, the at least one backup converter may be further configured to perform recharging management on any battery pack in a battery string in any energy storage branch. For example, the energy storage system includes one backup converter. It is assumed that in a scenario in which a first battery pack of a battery string in an energy storage branch 2 is recharged, the control circuit may control a switch in a second switch unit 2 connected to a shared bus in the energy storage branch 2 to be in an on state, so that the shared bus in the energy storage branch 2 and a backup converter are conducted. The control circuit may control the backup converter to be in a fourth working mode (recharging mode). When the backup converter is in the fourth working mode, the backup converter may input, to the shared bus in the energy storage branch 2, electric energy provided by an external power supply by using a first bus M. The control circuit may control a balancing converter 21 corresponding to the first battery pack to be in a fifth working mode. When the balancing converter 21 is in the fifth working mode, the balancing converter 21 may process electric energy on the shared bus, for example, perform step-down processing or step-up processing, and provide a processed voltage to a corresponding battery pack A21, to implement recharging management on the battery pack A21.

In one embodiment, the battery strings in the energy storage system may include battery packs with different input time, and recharging management is performed on the battery packs by using a backup converter. In this way, use efficiency or a use frequency of the backup converter can be improved, and the energy storage system can more flexibly adapt to different application scenarios. In addition, the backup converter not only may be used in a scenario in which a fault occurs in an energy storage system, but also may be used to recharge a battery pack. This improves operation reliability of the energy storage system and reduces costs. Compared with an energy storage system in which a backup battery string is disposed, the energy storage system provided in embodiments of this application has a smaller size.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. An energy storage system comprising:
a plurality of energy storage branches;
at least one switch unit; and
a control circuit, wherein, each of the energy storage branches comprises a first bus, a string-level converter, and a battery string that are sequentially connected in series, a plurality of balancing converters, and a shared bus, wherein, the battery string comprises a plurality of battery units connected in series, and each of the battery units comprises one battery pack; each of the battery packs is connected to an input side of one corresponding balancing converter, and output sides of the plurality of balancing converters are separately connected to the shared bus; and a positive terminal of the battery string is connected to the string-level converter, and a negative terminal of the battery string is connected to a reference ground;

wherein, the string-level converter is configured to: modulate a voltage on the first bus to a charging voltage to charge the battery string; or modulate a voltage of the battery string to a discharging voltage to charge a load coupled to the first bus;

wherein, each of the balancing converters is configured to: when the balancing converter operates in a first working mode, balance a current of a connected battery pack with a current of the battery packs of a first energy storage branch; and when the balancing converter operates in a second working mode, form a balancing loop among the connected battery pack, the balancing converter, and the shared bus and modulate a voltage of the shared bus to a charging voltage to charge the connected battery pack; or form the balancing loop among the connected battery pack, the balancing converter, and the shared bus and modulate the voltage of the connected battery pack to a discharging voltage and output the discharging voltage to the connected shared bus;

wherein, the switch unit is disposed between two neighboring energy storage branches; and shared buses in the two energy storage branches are conducted when the switch unit is in a first state, or the shared buses in the two energy storage branches are not conducted when the switch unit is in a second state; and wherein, the control circuit is separately coupled to the at least one switch unit and each of the energy storage branches and is configured to:

when any component in the first energy storage branch in the two neighboring energy storage branches is faulty, control a switch unit between the first energy storage branch and a neighboring second energy storage branch to be in the first state, and control an operating mode of each of the balancing converters in the first energy storage branch to switch from the first working mode to the second working mode, wherein the any component comprises a battery pack and/or a string-level converter.

2. The energy storage system according to claim 1, wherein, each switch unit comprises a plurality of switches, and each of the shared buses comprises a positive bus and a negative bus;

a first switch in the plurality of switches is connected between positive buses in the two neighboring energy storage branches, and a second switch in the plurality of switches is connected between negative buses in the two neighboring energy storage branches; and when the first switch and the second switch are both in an on state, the switch unit is in the first state, or, when the first switch and the second switch are both in an off state, the switch unit is in the second state.

3. The energy storage system according to claim 1, wherein, the any component is a first battery pack in the first energy storage branch, and the first battery pack is any battery pack in a battery string in the first energy storage branch; and the control circuit is further configured to:

control the string-level converter in the first energy storage branch to stop working, so that the battery string and a first bus in the first energy storage branch are open-circuited.

4. The energy storage system according to claim 1, wherein, the any component is a first battery pack in the first energy storage branch, and the first battery pack is any battery pack in a battery string in the first energy storage branch; and the control circuit is further configured to:

control the switch unit between the first energy storage branch and the second energy storage branch to be in the first state, so that the shared buses in the first energy storage branch and the second energy storage branch are conducted.

5. The energy storage system according to claim 1, wherein, the any component is a first battery pack in the first energy storage branch, and the first battery pack is any battery pack in a battery string in the first energy storage branch; and the control circuit is further configured to:

control a balancing converter connected to the first battery pack to stop working, so that the first battery pack and a shared bus in the first energy storage branch are not conducted.

6. The energy storage system according to claim 1, wherein, the any component is a first battery pack in the first energy storage branch, and the first battery pack is any battery pack in a battery string in the first energy storage branch; and the control circuit is further configured to:

control balancing converters respectively connected to battery packs in the first energy storage branch other than the first battery pack to switch from the first working mode to the second working mode.

7. The energy storage system according to claim 1, wherein, the battery unit further comprises:

a third switch and a fourth switch, the third switch is connected in series to the battery pack in the battery unit to form a first branch, the fourth switch is connected in parallel to the first branch, and the battery pack in the battery unit is short-circuited if the fourth switch is in an on state, or the battery pack in the battery unit is not short-circuited if the fourth switch is in an off state; and two neighboring battery units are conducted if a third switch in a previous battery unit in the two battery units is in an on state, or the two battery units are not conducted if the third switch in the previous battery unit is in an off state.

8. The energy storage system according to claim 7, wherein, the control circuit is further configured to:

control a third switch in a battery unit to which the first battery pack belongs to be in the off state and a fourth switch to be in the on state if a first battery pack in the first energy storage branch is faulty;

control the string-level converter in the first energy storage branch to stop working, so that a battery string and a first bus in the first energy storage branch are open-circuited;

control the switch unit between the first energy storage branch and the second energy storage branch to be in the first state, so that the shared buses in the first energy storage branch and the second energy storage branch are conducted; and control a balancing converter connected to a battery pack in the first energy storage branch other than the first battery pack to switch from the first working mode to the second working mode.

9. The energy storage system according to claim 1, wherein, each of the energy storage branches further comprises a circuit protection component, wherein a terminal of the circuit protection component is connected to the battery string, another terminal is connected to the string-level converter, and the circuit protection component is configured to perform overload protection on the energy storage branch.

10. The energy storage system according to claim 1, wherein, the string-level converter comprises a direct current/direct current converter or the string-level converter comprises a direct current/alternating current converter.

11. An energy storage system comprising:
at least one energy storage branch;
at least one switch unit;
at least one backup converter; and
a control circuit, wherein, each energy storage branch comprises a first bus, a string-level converter, and a battery string that are sequentially connected in series, a plurality of balancing converters, and a shared bus, wherein, the battery string comprises a plurality of battery units connected in series, and each of the battery units comprises one battery pack; the battery pack is connected to an input side of one corresponding balancing converter, and output sides of the plurality of balancing converters are separately connected to the shared bus; and a positive terminal of the battery string is connected to the string-level converter, and a negative terminal of the battery string is connected to a reference ground;
wherein, the string-level converter is configured to: modulate a voltage on the first bus to a charging voltage to charge the battery string; or modulate a voltage of the battery string to a discharging voltage to charge a load coupled to the first bus;
wherein, each balancing converter is configured to: when the balancing converter operates in a first working mode, balance a current of a connected battery pack with a current of the battery packs of a first energy storage branch; and when the balancing converter operates in a second working mode, form a balancing loop among the connected battery pack, the balancing converter, and the shared bus and modulate a voltage of the shared bus to a charging voltage to charge the connected battery pack; or form the balancing loop among the connected battery pack, the balancing converter, and the shared bus and modulate the voltage of the connected battery pack to a discharging voltage, and output the discharging voltage to the connected shared bus;
wherein, the shared bus is connected to one of the at least one backup converter by using one of the switch units; and the shared bus and the one backup converter are conducted when the switch unit is in a first state, or the shared bus and the one backup converter are not conducted when the switch unit is in a second state;
wherein, the backup converter is connected to a first bus in one of the at least one energy storage branches; and is configured to modulate a voltage on the connected first bus to a charging voltage to charge a battery string in the connected energy storage branch; or modulate a voltage of a battery string in the connected energy storage branch to a discharging voltage to charge a load coupled to the connected first bus; and
wherein, the control circuit is separately coupled to each switch unit and each energy storage branch, and is configured to:
when any component in the first energy storage branch in the plurality of energy storage branches is faulty, control a first switch unit connected to a shared bus in the first energy storage branch to be in the first state, so that the shared bus in the first energy storage branch and the backup converter are conducted by using the first switch unit; and control an operating mode of each balancing converter in the first energy storage branch to switch from the first working mode to the second working mode, wherein the first switch unit is a switch unit connected to the shared bus in the first energy storage branch; and the any component comprises a battery pack and/or a string-level converter, and the first energy storage branch is any one of the plurality of energy storage branches.

12. The system according to claim 11, wherein, the switch unit comprises a plurality of switches, and the shared bus comprises a positive bus and a negative bus;
a first switch in the plurality of switches is connected between the positive bus and a first terminal of the one backup converter, and a second switch in the plurality of switches is connected between the negative bus and a second terminal of the one backup converter; and
when the first switch and the second switch are both in an on state, the switch unit is in the first state; or when the first switch and the second switch are both in an off state, the switch unit is in the second state.

13. The system according to claim 11, wherein, the switch unit comprises one switch, the shared bus comprises a positive bus and a negative bus, and the negative bus is connected to a reference ground; and
the switch is connected between the positive bus and a first terminal of the one backup converter.

14. The energy storage system according to claim 11, wherein, the any component is a first battery pack in the first energy storage branch, and the first battery pack is any battery pack in a battery string in the first energy storage branch; and
the control circuit is further configured to:
control the string-level converter in the first energy storage branch to stop working, so that the battery string and a first bus in the first energy storage branch are open-circuited;
control the first switch unit to be in the first state, so that the shared bus in the first energy storage branch and a backup converter connected to the first switch unit are conducted;
control a balancing converter connected to the first battery pack to stop working, so that the first battery pack and the shared bus in the first energy storage branch are not conducted; and
control balancing converters respectively connected to battery packs in the first energy storage branch other than the first battery pack; to switch from the first working mode to the second working mode.

15. The energy storage system according to claim 11, wherein, the battery unit further comprises:
a third switch and a fourth switch, the third switch is connected in series to the battery pack in the battery unit to form a first branch, the fourth switch is connected in parallel to the first branch, and the battery pack in the battery unit is short-circuited if the fourth switch is in an on state, or the battery pack in the battery unit is not short-circuited if the fourth switch is in an off state;
two neighboring battery units are conducted if a third switch in a previous battery unit in the two battery units is in an on state, or the two battery units are not conducted if the third switch in the previous battery unit is in an off state; and the control circuit is further configured to:

control a third switch in a battery unit to which the first battery pack belongs to be in the off state and a fourth switch to be in the on state if a first battery pack in the first energy storage branch is faulty; and control the string-level converter in the first energy storage branch to stop working, so that the battery string and a first bus in the first energy storage branch are open-circuited.

16. The energy storage system according to claim 11, wherein, the battery unit further comprises:

a third switch and a fourth switch, the third switch is connected in series to the battery pack in the battery unit to form a first branch, the fourth switch is connected in parallel to the first branch, and the battery pack in the battery unit is short-circuited if the fourth switch is in an on state, or the battery pack in the battery unit is not short-circuited if the fourth switch is in an off state;

two neighboring battery units are conducted if a third switch in a previous battery unit in the two battery units is in an on state, or the two battery units are not conducted if the third switch in the previous battery unit is in an off state; and the control circuit is further configured to:

control the first switch unit to be in the first state, so that the first energy storage branch and the backup converter are conducted by using the first switch unit; and control a balancing converter corresponding to a battery pack in the first energy storage branch other than the first battery pack to switch from the first working mode to the second working mode.

17. The energy storage system according to claim 11, wherein, the energy storage branch further comprises a circuit protection component, wherein a terminal of the circuit protection component is connected to the battery string, another terminal is connected to the string-level converter, and the circuit protection component is configured to perform overload protection on the energy storage branch.

18. The energy storage system according to claim 11, wherein the string-level converter comprises a direct current/direct current converter; or the string-level converter comprises a direct current/alternating current converter.

* * * * *